United States Patent
Bournas (10) Patent No.: US 6,748,413 B1
(45) Date of Patent: Jun. 8, 2004

(54) METHOD AND APPARATUS FOR LOAD BALANCING OF PARALLEL SERVERS IN A NETWORK ENVIRONMENT

(75) Inventor: Redha M. Bournas, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,226

(22) Filed: Nov. 15, 1999

(51) Int. Cl.⁷ .................................................. G06F 9/00
(52) U.S. Cl. ....................... 709/105; 709/200; 709/217; 709/223; 709/224
(58) Field of Search .................................. 709/105, 235, 709/200, 201, 203, 217, 218, 219, 223, 224

(56) References Cited

U.S. PATENT DOCUMENTS

| | | | |
|---|---|---|---|
| 5,053,950 A | | 10/1991 | Naganuma et al. .......... 364/200 |
| 5,241,677 A | | 8/1993 | Naganuma et al. .......... 395/650 |
| 5,257,374 A | * | 10/1993 | Hammer et al. ............. 709/105 |
| 5,276,877 A | * | 1/1994 | Friedrich et al. ............. 703/13 |
| 5,539,883 A | | 7/1996 | Allon et al. ............ 395/200.11 |
| 5,606,693 A | | 2/1997 | Nilsen et al. ............... 395/610 |
| 5,774,660 A | * | 6/1998 | Brendel et al. .............. 709/201 |
| 5,774,668 A | * | 6/1998 | Choquier et al. ............ 709/223 |
| 5,819,045 A | | 10/1998 | Raman et al. .......... 395/200.56 |
| 5,845,116 A | * | 12/1998 | Saito et al. ................... 709/103 |
| 5,864,535 A | | 1/1999 | Basilico ....................... 370/231 |
| 5,867,706 A | * | 2/1999 | Martin et al. ................ 709/105 |
| 5,872,930 A | | 2/1999 | Masters et al. ......... 395/200.53 |
| 5,881,238 A | * | 3/1999 | Aman et al. ................. 709/104 |
| 5,915,095 A | * | 6/1999 | Miskowiec .................. 370/255 |
| 6,138,159 A | * | 10/2000 | Phaal .......................... 709/201 |
| 6,223,205 B1 | * | 4/2001 | Harchol-Balter et al. ... 709/105 |

* cited by examiner

Primary Examiner—Ario Etienne
Assistant Examiner—Barbara Burgess
(74) Attorney, Agent, or Firm—Gregory M. Doudnikoff; Carstens, Yee & Cahoon LLP

(57) ABSTRACT

A method and apparatus in a distributed data processing system for handling requests. The processing of each request received at a server system is monitored, wherein the server system includes a plurality of servers. An average work load size is estimated for the plurality of servers based on previous actual work load information in response to completion of processing of a request. A most recent value of the average work load size is assigned for the plurality of servers to each request arriving at the server system. The request is forwarded to a server within the plurality of servers having a lowest estimated amount of work to process.

36 Claims, 4 Drawing Sheets

METHOD AND APPARATUS FOR LOAD BALANCING OF PARALLEL SERVERS IN A NETWORK ENVIRONMENT

BACKGROUND OF THE INVENTION

1. Technical Field

The present invention relates generally to an improved distributed data processing system and in particular to the method of handling requests in a distributed data processing system. Still more particularly, the present invention relates to a method and apparatus for load balancing the requests from clients in a distributed data processing system.

2. Description of Related Art

Over the last few years, a surge in the number of Internet users and server providers has occurred. The number of Internet users has been growing geometrically since the early 1900's. This growth calls for capacity planning, performance, and management studies to properly handle the Internet traffic with the ultimate goal being to speed up users' response time, or increase their file transfer throughout. Some particular file serving applications that have been receiving particular attention are the World Wide Web (WWW) and the File Transfer Protocol (FTP). One problem to be solved is how to serve the increasing number of users and their work-load demands within acceptable users' performance criteria.

One solution is to make the server hardware run faster, but this is expensive. A cheaper solution is to provide a cluster of identical parallel servers to accommodate the large transaction rates of the requests generated by the users (the number of servers being dependent on these rates). The servers share the data and the network address; to the users, these servers appear as a single node. This solution, however, requires the assignment of each request to the right server. This arrangement means that new techniques to balance the load among the servers are needed. Special attention has been made to the case where the clients are only reading information from servers, such as for example, Web servers. The load balancing of the servers means that the servers should be as evenly loaded as possible at any given time. It is important to avoid assigning requests to a server that is busier than another one. This rule reduces unnecessary queueing time and thus will not increase the user's response time. It will also reduce congestion at the servers and thus avoid any resource allocation problems that may arise.

Mechanisms presently available for load balancing the servers include the following schemes: (1) round robin; (2) forward the request to the server with the least number of requests in its queue; (3) forward the request to the server with the fastest response time; and (4) use a server agent to determine the actual load on each server.

The knowledge of the load at each server at any decision point is an important element. Techniques (1) and (2) above do not take into account such information, while techniques (3) and (4) do. The latter methods, however, require communication with the servers to obtain the load statistics. This requirement requires specific software to run on the servers and the front-end processor (the load balancing node). Techniques (1) and (2) usually do not work well because the statistical distributions of the workloads generated by the clients are not identical. Using these methods may cause one server to be busier than another. For example, consider the case of two clients and two servers. One client is generating a heavy work load, while the other one is generating a light one. If it so happens that the arrival pattern of requests to the front-end processor is such that the odd numbered requests are from the first client and the even numbered requests are from the second one, then it will be the case that one server will be a lot busier than the other one.

Therefore, it would be advantageous to have an improved method and apparatus for load balancing parallel servers in a distributed data processing system.

SUMMARY OF THE INVENTION

The present invention provides a method and apparatus in a distributed data processing system for handling requests. The processing of each request received at a server system is monitored, wherein the server system includes a plurality of servers. An average work load size is estimated for the plurality of servers based on previous actual work load information in response to completion of processing of a request. A most recent value of the average work load size is assigned for the plurality of servers to each request arriving at the server system. The request is forwarded to a server within the plurality of servers having a lowest estimated amount of work to process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
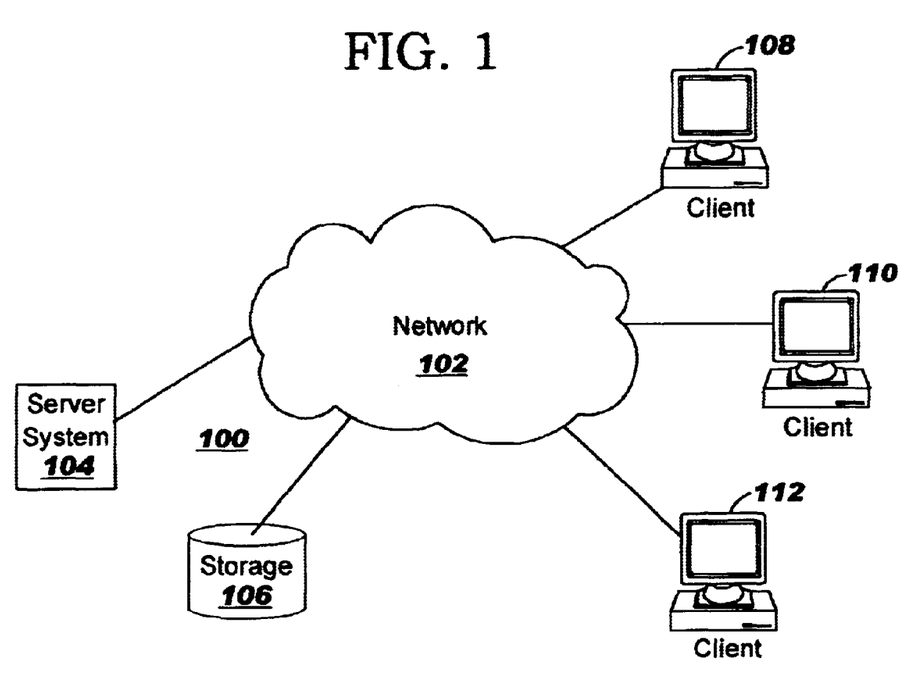
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communication links between various devices and computers connected together within distributed data processing system 100. Network 102 may include permanent connections, such as wire or fiber optic cables, or temporary connections made through telephone connections.

In the depicted example, a server system 104 is connected to network 102 along with storage unit 106. Server system 104 typically will contain two or more servers and is also referred to as a "cluster." In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN). FIG. 1 is intended as an example and not as an architectural limitation for the present invention.

Figure 2:
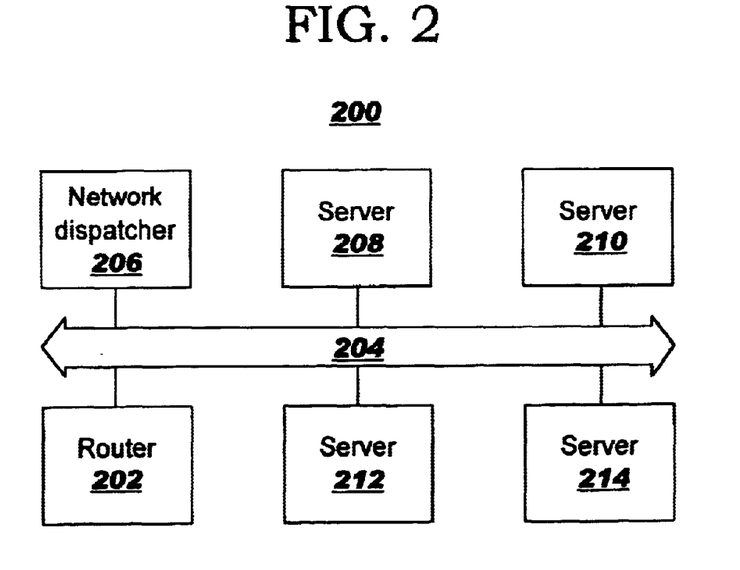
FIG. 2 is a server system depicted in accordance with a preferred embodiment of the present invention.

Turning now to FIG. 2, a server system is depicted in accordance with a preferred embodiment of the present invention. Server system 200 may be implemented as server system 104 in FIG. 1.

Server system 200 in this example includes a router 202, which receives requests from clients. Router 202 is connected to a bus 204. This bus also provides an interconnection for network dispatcher 206. Network dispatcher 206 is also referred to as a "front-end processor". Also within server system 200 are servers 208, 210, 212, and 214. These servers are identical servers in these examples. Identical servers are-servers that process requests at the same rate.

Network dispatcher 206 will receive requests from router 202 and send the requests to a server within server system 200 for processing. Responses to the requests will be routed from the server processing the request back to the client through router 202 in these examples. In accordance with a preferred embodiment of the present invention, a client making a request to a server and server system 200 only sees a single server. Servers 208, 210, 212, and 214 share data received within server system 200, as well as the network address. For example, a request to server system 200 is made to a particular network address, such as an Internet Protocol (IP) address. Router 202 will receive the request and route this request to network dispatcher 206. In turn, network dispatcher 206 will send the request to the appropriate server for processing. This routing of the request to an appropriate server for processing is transparent and is not visible to a client making a request.

The illustration of server system 200 in FIG. 2 is not meant to imply architectural limitations to the present invention. For example, only four servers are illustrated in the system. Other numbers of servers may be used to implement a server system. Additionally, bus 204 may take various forms. Bus 204 also may take the form of a local area network or some other shared resource mechanism to transfer data within server system 200.

Figure 3:
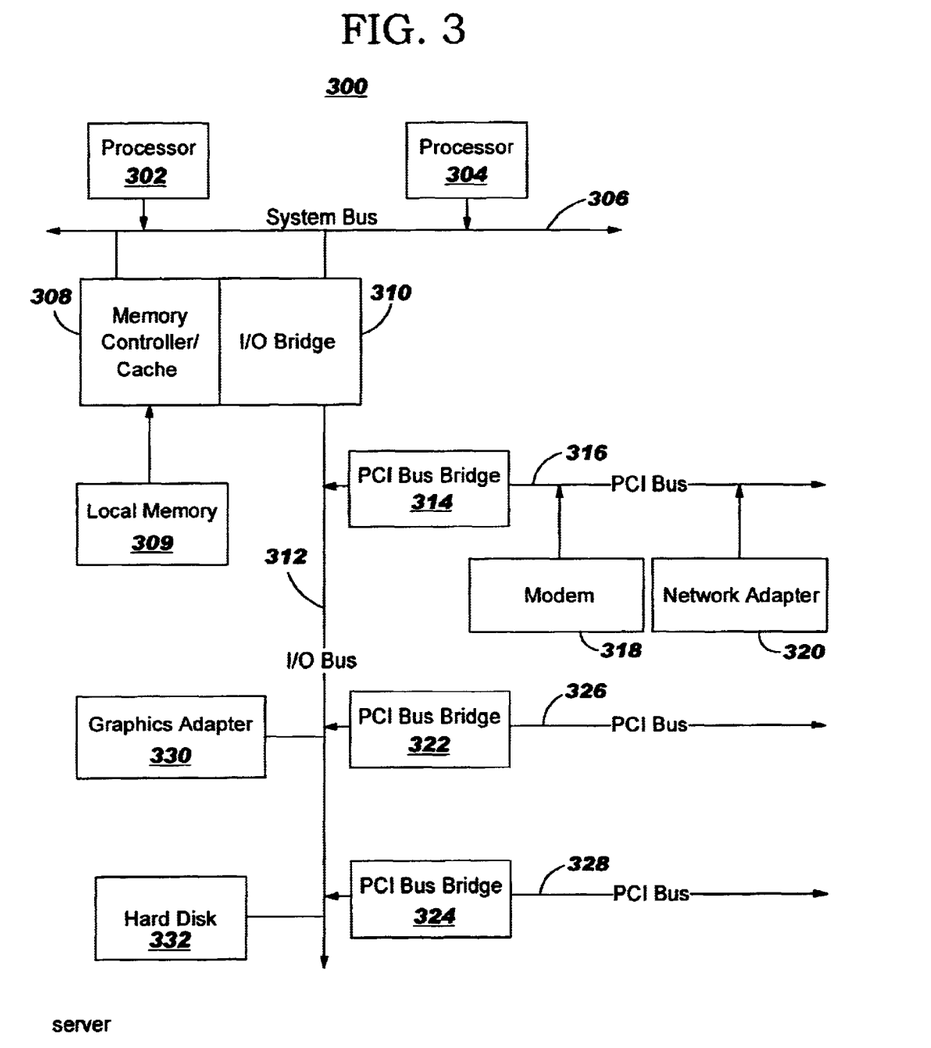
FIG. 3 is a block diagram depicting a data processing system that may be implemented as a server or network dispatcher in accordance with a preferred embodiment of the present invention.

Referring to FIG. 3, a block diagram depicting a data processing system that may be implemented as a server or network dispatcher in accordance with a preferred embodiment of the present invention. Data processing system 300 may be implemented as a server, such as servers 208, 210, 212, or 214 in FIG. 2. Further, a network dispatcher, such as network dispatcher 206 in FIG. 2, may be implemented using data processing system 300.

Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 108–112 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

The present invention provides a method, apparatus, and computer implemented instructions for balancing the load for processing requests generated by end users evenly among identical parallel servers in a network environment. The present invention provides a mechanism in which load balancing is accomplished by estimating an average amount of work to be performed for a new arriving request based on previous systems data observations for servers processing requests. This information is used to enable a load balancing node, such as network dispatcher 206 in FIG. 2, to assign a new request to the appropriate "right" server with as much accuracy as possible. With the estimate of work queued or being processed to each server, a new arriving request is assigned to a server with the least amount of work in its queue. The server is also referred to as the right server. The actual amount of work performed for each request may be measured as network packets flow through the network dispatcher.

The mechanism of the present invention does not require the load balancing node (i.e. network dispatcher) to communicate with the servers to get information on their respective loads. Instead, the mechanism of the present invention measures the loads as the traffic going through the servers is monitored. An assumption is made that traffic flowing from the servers to the clients is also traversing the front-end processor. The amount of work queued at each server is estimated. By using this information, a new arriving request is assigned to the server with the least amount of work in its queue. This server is also called the "right server." The actual amount of work done for each request is measured as the network packets flow through the front-end processor. At the completion of each request, an average work load size based on the amount of work completed by all servers and the total number of completed requests is estimated. Also, the server with the least amount of work in its queue is identified. At the arrival of a new request, an estimate of an average work load size is determined based on previous actual work load measurements, forward the request to the right server, and update the amount of work in the queue of this latter server.

The assignment of a work load size to a new arriving request is an artifice to load balance the servers. This type of assignment is used because the actual amount of work to be done by this request is not known at the arrival epoch and will not be known until the request is completed. This mechanism is better than randomly assigning requests to the servers as it is done with the "round robin" and "forward to the server with the least number of active requests" methods. The reason why the random assignment does not work is because the work load requests are not statistically identical. The front-end processor is assumed to have a means to determine when a server is no longer operational and in that case remove it from the cluster. This front-end processor is also called a "network dispatcher".

An assumption is made that m clients connected to a cluster of identical parallel servers via a network. The number of servers in the cluster is greater than or equal to two. To the clients, one server is apparent. The servers share the same network address and data (through a common storage structure) and work at the same rate. All the clients' requests are addressed to a front-end processor that does the load balancing for the parallel servers and forwards each request to the right server. The work load sizes generated by each client i, $\{X_x^{(i)}, k=1,2,\ldots\}, i=1,2,\ldots,m$, are independent and identically distributed random variables with finite mean and variance. However, for any two distinct clients, the distributions of the work load sizes are generally not identical. At any arrival instant, the front-end processor does not have information on the work load sizes. The knowledge of this information allows a determination to be made of the server to which a new request is to be forwarded. The problem solved by the present invention is how to forward each arriving request to the right server, so that the long term averages of the loads at the servers are equal.

Figure 4:
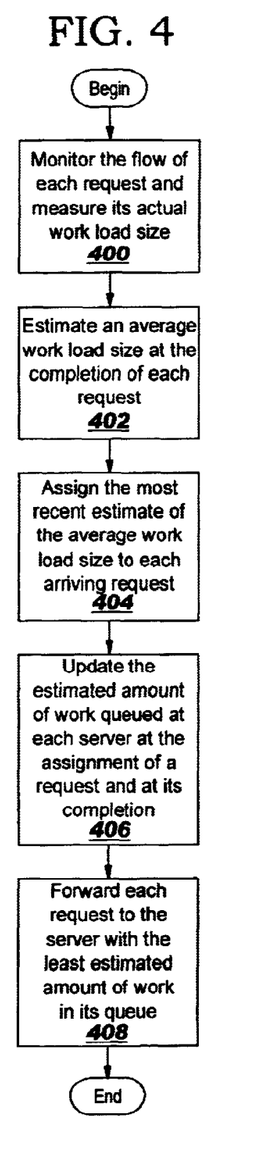
FIG. 4 is a high level flowchart of a process for load balancing servers depicted in accordance with a preferred embodiment of the present invention.

With reference now to FIG. 4, a high level flowchart of a process for load balancing servers is depicted in accordance with a preferred embodiment of the present invention. The process illustrated in FIG. 4 estimates the amount of work queued at each server. This information is used to assign a new arriving request to the server having the least amount of work in its queue.

The actual amount of work performed for each request is measured as the network packets flow through the network dispatcher.

The process begins by monitoring the flow of each request and measuring the actual work load size of each request (step 400). Next, an estimate of an average work load size is made at the completion of each request (step 402). The most recent estimate of the average work load size is assigned to each arriving request (step 404). The estimated amount of work queued at each server is updated at the assignment of a request and its completion (step 406). Each request is forwarded to the server with the least estimated amount of work in its queue (step 408).

The analysis is begun by determining the exact expected value of the work load size. Let $X^{(i)}$ represents the random process $\{X_k^{(i)}, k=1,2,\ldots\}, i=1,2,\ldots,m$, and $n_i$ be the number of occurrences of $X^{(i)}, i=1,2,\ldots,m$, in the arrival time interval of length T with respect to the origin. Also let N be the total number of arrivals in the time interval T and for each $i=1,2,\ldots,m$, $$a_i = \lim_{i \to \infty} \frac{n_i}{N}. \qquad [2.1]$$

Note that the set $\{a_1, a_2, \ldots, a_m\}$ is a probability distribution function, i.e. $0 < a_i < 1$ for each i and $$\sum_{i=1}^{m} a_i = 1.$$

The expected work load size $\overline{S}$ is then:

$$\overline{S} = \lim_{N \to \infty} \frac{\sum_{i=1}^{m} n_j E[X^{(i)}]}{N} = \sum_{i=1}^{m} a_i E[X^{(i)}] \qquad [2.2]$$

Let us define the random process Y as follows:

$$Y = \begin{cases} X^{(1)} & \text{with probability } a_1, \\ X^{(2)} & \text{with probability } a_2, \\ \ldots & \ldots \ldots \ldots, \\ X^{(m)} & \text{with probability } a_m \end{cases} \qquad [2.3]$$

If for each i, $i=1,2,\ldots,m$, the probability function of $X^{(i)}$ is denoted by $F_x^{(i)}$, then the probability function of Y is given by:

$$F_y(x) = \sum_{i=1}^{m} a_i F_x^{(i)} \qquad [2.4]$$

Let $Y_1, Y_2, \ldots$, be independent and identically distributed random variables with probability function $F_y$. Suppose $Y_1, Y_2, \ldots$, are the service distributions of the work load requests at arrival epochs $1, 2, \ldots$, respectively. The expected value of the work load size of this service process E[Y], equal to $\overline{S}$, the average work load size of the original service process with distribution $X^{(1)}, X^{(2)}, \ldots, X^{(m)}$. In a queuing system with the service process consisting of the independent and identically distributed random variables $Y_1, Y_2, \ldots$, and the same arrival process of requests as that of the original system, the round robin policy is optimal because the servers are identical. This holds true with the added assumption that the initial system state of all queues is zero. Using this argument, the routing policy to be defined below for the original arrival and service processes will be as close as possible to an optimal policy in the sense of distributing the average work load evenly amongst the servers. This policy is defined as:
1. Monitor the flow of each request and record its actual work load size at service completion time.
2. At the completion of each service request, estimate the average work load size using all previous actual work load size information.
3. Keep track of the estimated work load queued at each server.
4. Assign the most recent value of the estimated average work load size to each arriving request.
5. Forward each arriving request to the server with the least estimated amount of work in its queue.

Next, an estimate of an average work load size of an arriving request is presented based on all the previous state observations. It is assumed that the front-end processor monitors the flow of each request and measures the work load size during the session data flow. Let n be the total number of requests that arrived since the initial time and $y_1, y_2, \ldots, y_n$ be the actual work load sizes (as observed and recorded by the front-end processor). Define $\bar{y}_{n+1}$ as an estimate of an average work load size of the (n+1)th arriving request. The following estimate for $\bar{y}_{n+1}$ is used:

$$\bar{y}_{n+1} = \frac{\sum_{i=1}^{n} y_i}{n} \quad [2.5]$$

It can be shown that for large values of n, the estimate given by [2.5] approaches the exact value of the expected work load size given by [2.2]. Let $k^{(i)}, i=1,2,\ldots,m$, be the number of occurrences of the random process $X^{(i)}$ in the n observations $y_1, y_2, \ldots, y_n$, so that $$\sum_{i=1}^{m} k^{(i)} = n.$$

For each i, let $x_1^{(i)}, x_2^{(i)}, \ldots, x_k^{(i)}$ be the $k^{(i)}$ observations of $X^{(i)}, i=1,2,\ldots,m$. We write $\bar{y}_{n+1}$ as:

$$\bar{y}_{n+1} = \frac{\sum_{i=1}^{m} \sum_{j=1}^{k(i)} x_j^{(i)}}{n} \quad [2.6]$$

Equation [2.6] may be rewritten as:

$$\bar{y}_{n+1} = \sum_{i=1}^{m} \left(\frac{k^{(i)}}{n}\right)\left(\frac{\sum_{j=1}^{k(i)} x_j^{(i)}}{k^{(i)}}\right) \quad [2.7]$$

By the Law of Large Numbers, for each i, as $k^{(i)} \to \infty$ (because $n \to \infty$):

$$\frac{\sum_{j=1}^{k(i)} x_j^{(i)}}{k^{(i)}} \to E[X^{(i)}] \text{ and} \quad [2.8]$$

$$\frac{k^{(i)}}{n} \to Pr(Y = X^{(i)}) = a_i \quad [2.9]$$

so that as $n \to \infty$, $$\bar{y}_{n+1} \to \sum_{i=1}^{m} a_i E[X^{(i)}] \quad [2.10]$$

By equation [2.2], the right hand side of [2.10] equals $\bar{S}$. This proves the claim.

Figures 5, 7:
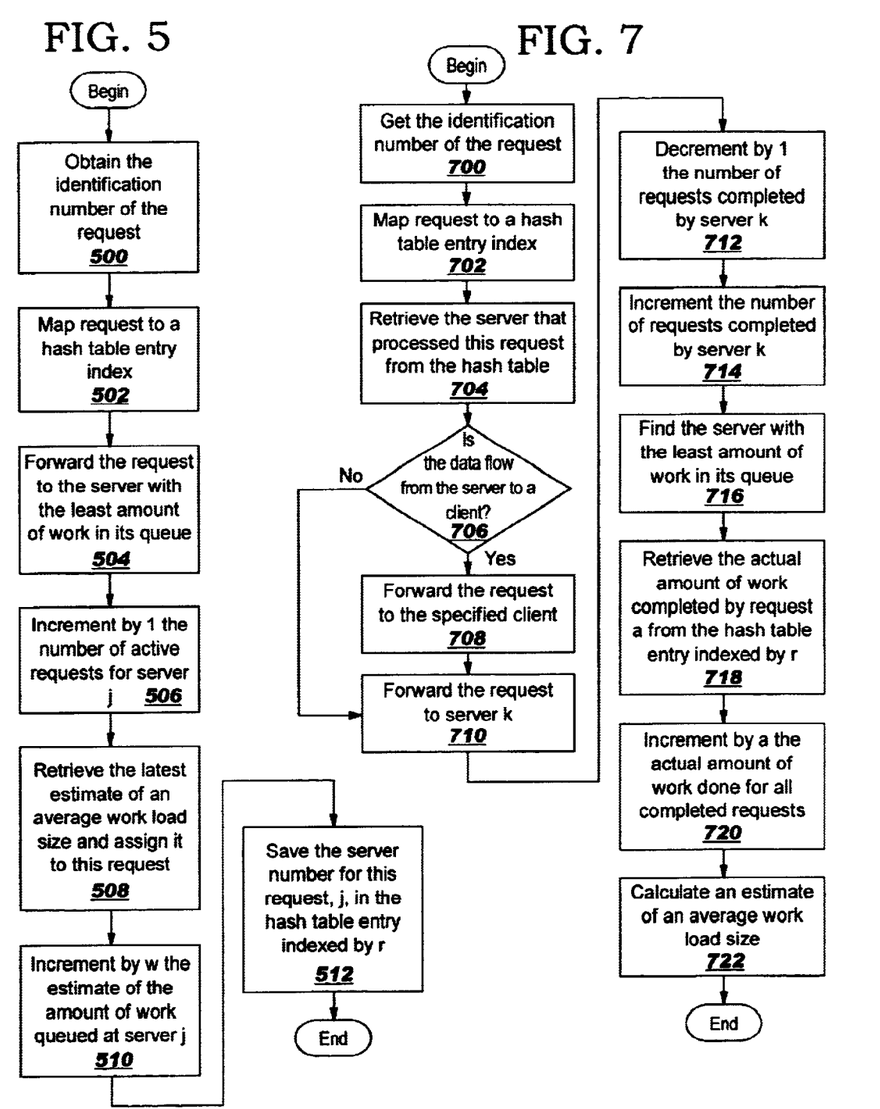
FIG. 5 is a flowchart of a process to handle a new request for session establishment depicted in accordance with a preferred embodiment of the present invention.
FIG. 7 is a flowchart of a process to handle a session closure depicted in accordance with a preferred embodiment of the present invention.
Figure 6:
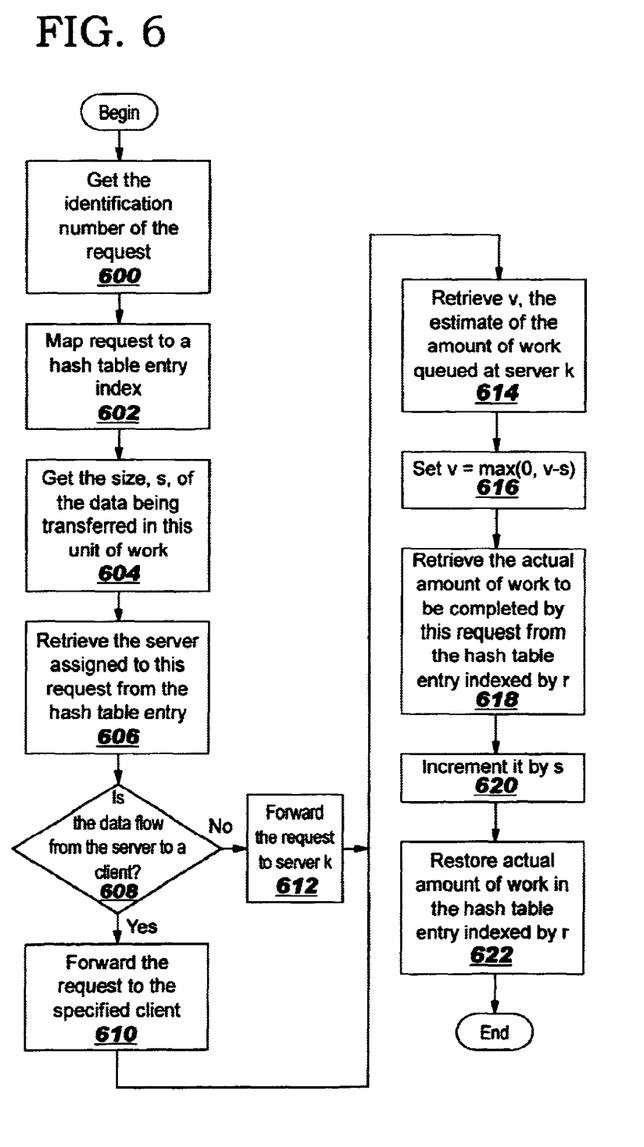
FIG. 6 is a flowchart of a process to handle a request for a data transfer depicted in accordance with a preferred embodiment of the present invention.

With reference now to FIGS. 5–7, flowcharts illustrating a process to assign a new request to a right server are depicted. Each of these figures deals with one of the three phases of a data transfer session: (1) session establishment; (2) data transfer; and (3) session closure. A set of global variables is used for each of these phases. The variables used include an identification number for each request. This identification number may be generated in a number of ways. For example, the identification number may be generated as a function of the sender address and the receiver network address. The number of active requests at each server also is tacked. Active requests are those requests not yet completed. The variables also include a number of completed requests for each server. An estimate of the average work load size and an estimate of an average amount of work to be done by an arriving request also are tracked in variables. The variables also include an estimate of the amount of work queued at each server as well as the identification of the server with the least amount of work in its queue. The actual amount of work completed for each request and the actual amount of work completed by all servers also are stored in variables used by these processes.

With reference now to FIG. 5, a flowchart of a process to handle a new request for session establishment is depicted in accordance with a preferred embodiment of the present invention. FIG. 5 illustrates the first phase of a data transfer session in which the session is established. The process begins by obtaining the identification number for the request (step 500), thereafter, the request is mapped to a hash table entry index, such as a variable r (step 502). The request is then forwarded to a server with the least amount of work in its queue (step 504). This server may be identified by the variable j in this example. Thereafter, the number of active requests for server j is incremented by one (step 506). The latest estimated work load size, w, is retrieved and assigned to this request (step 508). Next, an estimate of the amount of work queued at server j is incremented by w (step 510). Thereafter, the server number for this request, j, is saved in the hash table for the entry indexed to the variable r (step 512) with the process terminating thereafter.

With reference now to FIG. 6, a flowchart of a process to handle a request for a data transfer is depicted in accordance with a preferred embodiment of the present invention. FIG. 6 illustrates the second phase in a data transfer session in which the data transfer actually occurs.

The process begins by obtaining the identification number of the request (step 600), and mapping the request to a hash table entry index r (step 602). The size, s, of the data being transferred in this unit of work is obtained from the network packet (step 604). Thereafter, the server, server k, assigned to this request is retrieved from the hash table using the index r (step 606). A determination is then made as to whether the data transfer is flowing from a server to a client (step 608). If the data transfer is flowing from a server to a client, the request is forwarded to the specified client (step 610). Otherwise, the request is forwarded to server k (step 612). In either event, the estimate of the amount of work queued at server k is retrieved (step 614). This estimate of the amount of work may be represented by the variable v.

Thereafter, v is said equal to MAX (0, v-s) (step 616). Next, the actual amount of work to be completed by this request is retrieved from the hash table entry indexed by r (step 618). This amount of work is incremented by s (step 620), and the actual amount of work to be completed by the request is restored in the hash table entry indexed by r (step 622) with the process terminating thereafter.

With reference now to FIG. 7, a flowchart of a process to handle a session closure is depicted in accordance with a preferred embodiment of the present invention. FIG. 7 illustrates a third phase in a data transfer session in which the session is closed.

The process begins by obtaining the identification number of the request (step 700), and mapping the request to a hash table entry index, r (step 702). Thereafter, a server k that processed the request is retrieved from the hash table identified by index r (step 704). A determination is made as to whether the data flow is from the server to a client (step 706). If the data flow is from a server to a client, the request is forwarded to the specified client (step 708), otherwise, the request is forwarded to server k (step 710). In either event, the number of active requests at server k is then decremented by one (step 712). Next, the number of requests completed by server k is incremented by one (step 714). A server j having the least amount of work in its queue is identified (step 716). If for some reason two or more servers have the same amount of work in their queues, the server with the smallest number of active requests is the one selected as server j. The actual amount of work completed by this request, a, is retrieved by the hash table entry indexed by the variable r (step 718). Thereafter, the actual amount of work performed for all completed requests is incremented by the actual amount of work completed by request a (step 720) and an estimate of an average work load size w is calculated (step 722) with the process terminating thereafter. This average work load size w is assigned to the next arriving request. The average work load size may be calculated by dividing the actual amount of work completed by all servers by the total number of completed requests.

Thus, the present invention provides an improved mechanism for load balancing workloads for a server system. The mechanism involves estimating the average work load size. This work load size is estimated by summing all of the previously observed actual work load sizes by all servers divided by the total number of observed requests. In this manner, a new arriving request for a server may be assigned to the right server, which is the one containing the least amount of work in its queue. This mechanism provides a more accurate load balancing system for servers when the goal is to balance loads between servers as evenly as possible.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for handling requests, the method comprising the computer implemented steps of:

monitoring processing of each request received at a server system, wherein the server system includes a plurality of servers;

estimating an average work load size for the plurality of servers based on previous actual work load information in response to completion of processing of a request;

assigning a most recent value of the average work load size for the plurality of servers to each request arriving at the server system; and forwarding each request to a server within the plurality of servers having a lowest estimated amount of work to process, after assigning of the most recent value of the average work load size occurs.

2. The method of claim 1, wherein the server system includes a network dispatcher and wherein the step of monitoring, estimating, assigning, and forwarding is handled by the network dispatcher.

3. The method of claim 1, wherein the plurality of servers are a plurality of web servers.

4. The method of claim 1, wherein the distributed data processing system is an Internet.

5. The method of claim 1, wherein the distributed data processing system is an intranet.

6. The method of claim 1, further comprising storing estimates of an average work load size for the plurality of servers in a hash table.

7. The method of claim 1, wherein the monitoring is performed without communicating with the plurality of servers.

8. The method of claim 1, wherein the monitoring identifies actual work load information.

9. The method of claim 8, wherein the actual work load information is an actual work load size for each request.

10. A method for establishing a session to a server system including a plurality of servers, the method comprising the computer implemented steps of:

receiving a request to establish a session;

forwarding the request to a server within the plurality of servers in the server system having a least amount of work;

assigning an estimate of an average work load size to the request;

incrementing an estimate of an amount of work for the server by the average work load size to form a current estimate of an amount of work for the server; and associating the server with the request.

11. The method of claim 10 further comprising: incrementing a number of active requests for the server.

12. The method of claim 11 further comprising:

identifying an amount of data to be transferred;

identifying the server assigned to the request; and performing a data transfer for the amount of data.

13. The method of claim 12 further comprising:

responsive to a data transfer to the server system, forwarding the data to the server.

14. The method of claim 12 further comprising:
responsive to a data transfer to a client, forwarding the data to the client.

15. The method of claim 12 further comprising:
decrementing a number of active requests for the server in response to the data transfer;
incrementing a number of completed requests for the server in response to the data transfer;
incrementing an actual amount of work done for the plurality of servers after the data transfer to form current actual amount of work done;
identifying a server with a least amount of work after the data transfer; and
generating an estimate of an average work load size using the current actual amount of work done and the number of completed transfers.

16. The method of claim 15, further comprising:
wherein the generating step comprises:
generating an estimate of an average work load size by dividing current actual amount of work done for the plurality of servers by the number of completed requests.

17. A server system comprising:
a data transfer mechanism;
a plurality of servers coupled to the data transfer system; and
a network dispatcher, wherein the network dispatcher monitors processing of each request received at the server system, estimates an average work load size for the plurality of servers based on previous actual work load information in response to completion of processing of a request, assigns a most recent value of the average work load size for the plurality of servers to each request arriving at the server system, and forwards each request to a server within the plurality of servers having a lowest estimated amount of work to process, after the most recent value of the average work load size is assigned.

18. A distributed data processing system for handling requests, the distributed data processing system comprising:
monitoring means for monitoring processing of each request received at a server system, wherein the server system includes a plurality of servers;
estimating means for estimating an average work load size for the plurality of servers based on previous actual work load information in response to completion of processing of a request;
assigning means for assigning a most recent value of the average work load size for the plurality of servers to each request arriving at the server system; and
forwarding means, responsive to the assigning means assigning the most recent value of the average work load size, for forwarding each request to a server within the plurality of servers having a lowest estimated amount of work to process.

19. The distributed data processing system of claim 18, wherein the server system includes a network dispatcher and wherein the monitoring means, estimating means, assigning means, and forwarding means are handled by the network dispatcher.

20. The distributed data processing system of claim 18, wherein the plurality of servers are a plurality of web servers.

21. The distributed data processing system of claim 18, wherein the distributed data processing system is an Internet.

22. The distributed data processing system of claim 18, wherein the distributed data processing system is an intranet.

23. The distributed data processing system of claim 18, further comprising storing estimates of an average work load size for the plurality of servers in a hash table.

24. A distributed data processing system for establishing a session to a server system including a plurality of servers, the distributed data processing system comprising:
receiving means for receiving a request to establish a session;
forwarding means for forwarding the request to a server within the plurality of servers in the server system having a least amount of work;
assigning means for assigning an estimate of an average work load size to the request;
incrementing means for incrementing an estimate of an amount of work for the server by the average work load size to form a current estimate of an amount of work for the server; and
associating means for associating the server with the request.

25. The distributed data processing system of claim 24 further comprising:
incrementing means for incrementing a number of active requests for the server.

26. The distributed data processing system of claim 25 further comprising:
first identifying means for identifying an amount of data to be transferred;
second identifying means for identifying the server assigned to the request; and
performing means for performing a data transfer for the amount of data.

27. The distributed data processing system of claim 26 further comprising:
forwarding means, responsive to a data transfer to the server system, for forwarding the data to the server.

28. The distributed data processing system of claim 26, further comprising:
forwarding means, responsive to a data transfer to a client, for forwarding the data to the client.

29. The distributed data processing system of claim 26 further comprising:
decrementing means for decrementing a number of active requests for the server in response to the data transfer;
first incrementing means for incrementing a number of completed requests for the server in response to the data transfer;
second incrementing means for incrementing an actual amount of work done for the plurality of servers after the data transfer to form current actual amount of work done;
identifying means for identifying a server with a least amount of work after the data transfer; and
generating means for generating an estimate of an average work load size using the current actual amount of work done and the number of completed transfers.

30. The distributed data processing system of claim 29, further comprising:
wherein the means of generating comprises:
generating means for generating an estimate of an average work load size by dividing current actual amount of work done for the plurality of servers by the number of completed requests.

31. A computer program product in a computer readable medium for handling requests, the computer program product comprising:

first instructions for monitoring processing of each request received at a server system, wherein the server system includes a plurality of servers;

second instructions for estimating an average work load size for the plurality of servers based on previous actual work load information in response to completion of processing of a request;

third instructions for assigning a most recent value of the average work load size for the plurality of servers to each request arriving at the server system; and fourth instructions, responsive to the third instructions assigning the most recent value of the average work load size, for forwarding each request to a server within the plurality of servers having a lowest estimated amount of work to process.

32. A computer program product in a computer readable medium for establishing a session to a server system including a plurality of servers, the computer program product comprising:

first instructions for receiving a request to establish a session;

second instructions for forwarding the request to a server within the plurality of servers in the server system having a least amount of work;

third instructions for assigning an estimate of an average work load size to the request;

fourth instructions for incrementing an estimate of an amount of work for the server by the average work load size to form a current estimate of an amount of work for the server; and fifth instructions for associating the server with the request.

33. A method for handling requests received by a server system having a plurality of servers, the method comprising the computer implemented steps of:

monitoring processing of requests received at the server system to identify work load information, wherein the monitoring occurs without communication with the plurality of servers;

responsive to completion of processing of a request, estimating an average work load size for the plurality of servers based on previous actual work load information; and forwarding each request to a server within the plurality of servers having a lowest estimated amount of work to process.

34. The method of claim 33 further comprising:

assigning a most recent value of the average work load size to each request prior to forwarding of each request.

35. The method of claim 33, wherein monitoring includes measuring packets flowing through the server system.

36. A computer program product in a computer readable medium for handling requests received by a server system having a plurality of servers, the computer program product comprising:

first instructions for monitoring processing of requests received at the server system to identify work load information, wherein the monitoring occurs without communication with the plurality of servers;

second instructions, responsive to completion of processing of a request, for estimating an average work load size for the plurality of servers based on previous actual work load information; and third instructions for forwarding each request to a server within the plurality of servers having a lowest estimated amount of work to process.

* * * * *